US010600420B2

(12) United States Patent
Faulkner et al.

(10) Patent No.: US 10,600,420 B2
(45) Date of Patent: *Mar. 24, 2020

(54) ASSOCIATING A SPEAKER WITH REACTIONS IN A CONFERENCE SESSION

(71) Applicant: Microsoft Technology Licensing, LLC, Redmond, WA (US)

(72) Inventors: Jason Thomas Faulkner, Seattle, WA (US); Sonu Arora, Kirkland, WA (US); Santhosh Kumar Misro, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/707,282

(22) Filed: Sep. 18, 2017

(65) Prior Publication Data

US 2018/0330736 A1 Nov. 15, 2018

Related U.S. Application Data

(60) Provisional application No. 62/506,554, filed on May 15, 2017.

(51) Int. Cl.
*G10L 13/00* (2006.01)
*G10L 17/00* (2013.01)
(Continued)

(52) U.S. Cl.
CPC .......... *G10L 17/005* (2013.01); *G10L 15/265* (2013.01); *H04L 12/1822* (2013.01);
(Continued)

(58) Field of Classification Search
CPC ......... G10L 15/26; G10L 17/22; G10L 15/22; G10L 25/48; G10L 15/265; G10L 15/30;
(Continued)

(56) References Cited

U.S. PATENT DOCUMENTS 7,349,944 B2 * 3/2008 Vernon ............. H04L 29/06027
709/204
8,121,277 B2 2/2012 Baird
(Continued)

FOREIGN PATENT DOCUMENTS

| EP | 1798945 A1 | 6/2007 |
|---|---|---|
| EP | 2784703 A1 | 10/2014 |
| EP | 3163868 A1 | 5/2017 |

OTHER PUBLICATIONS

"Non Final Office Action Issued in U.S. Appl. No. 15/636,529", dated Dec. 11, 2017, 17 Pages.
(Continued)

*Primary Examiner* — Edgar X Guerra-Erazo
(74) *Attorney, Agent, or Firm* — Newport IP, LLC; Jacob P. Rohwer

(57) ABSTRACT

Described herein is a system configured to determine when burst activity (e.g., an activity hotspot) occurs in a conference session, and to associate the burst activity with a speaker that is speaking at a time when the burst activity occurs. Burst activity occurs when a threshold number of notable events (e.g., five, ten, fifty, one hundred, one thousand, etc.) occur within a threshold time period (e.g., ten seconds, thirty seconds, one minute, etc.). In various examples, the thresholds can be established relative to a number of participants in a conference session and/or a duration of a conference session (e.g., a scheduled duration). The system can then communicate data indicating that a threshold number of events occurred while an individual speaker is speaking.

20 Claims, 10 Drawing Sheets

(51) Int. Cl.
  *H04L 29/06* (2006.01)
  *H04L 12/58* (2006.01)
  *H04L 29/08* (2006.01)
  *G10L 15/26* (2006.01)
  *H04W 4/08* (2009.01)
  *H04L 12/18* (2006.01)

(52) U.S. Cl.
  CPC .......... *H04L 51/046* (2013.01); *H04L 65/403* (2013.01); *H04L 67/22* (2013.01); *H04W 4/08* (2013.01); *H04L 67/26* (2013.01); *H04L 67/306* (2013.01)

(58) Field of Classification Search
  CPC ....... G10L 13/00; G10L 15/00; G10L 17/005; G10L 13/027; G10L 13/033; G10L 15/07; G10L 15/183; G10L 15/28; G10L 15/32; G06F 17/2765; G06F 17/2785; G06F 3/167; G06F 17/21; G06F 17/30654; G06F 17/2881; G08C 2201/31
  See application file for complete search history.

(56) References Cited

U.S. PATENT DOCUMENTS

| | | | |
|---|---|---|---|
| 8,145,705 B1 * | 3/2012 | Rust | G06Q 10/10 709/203 |
| 8,214,374 B1 | 7/2012 | Acharya | |
| 8,352,547 B1 * | 1/2013 | Rust | G06Q 10/10 709/203 |
| 8,654,951 B1 | 2/2014 | Olmsted et al. | |
| 8,670,018 B2 | 3/2014 | Cunnington et al. | |
| 8,887,068 B2 | 11/2014 | Roberts et al. | |
| 8,913,103 B1 * | 12/2014 | Sargin | G06K 9/00221 348/14.12 |
| 9,031,839 B2 | 5/2015 | Thorsen et al. | |
| 9,058,806 B2 * | 6/2015 | Sankar | G10L 17/02 |
| 9,300,811 B2 | 3/2016 | Kaplan et al. | |
| 9,420,227 B1 * | 8/2016 | Shires | G06F 17/27 |
| 9,538,129 B2 | 1/2017 | Reynolds | |
| 9,621,854 B2 | 4/2017 | Goyal et al. | |
| 10,185,711 B1 * | 1/2019 | Shires | G06F 17/27 |
| 2004/0255232 A1 | 12/2004 | Hammond et al. | |
| 2006/0200520 A1 * | 9/2006 | Vernon | H04L 29/06027 709/204 |
| 2008/0077583 A1 | 3/2008 | Castro et al. | |
| 2010/0131866 A1 | 5/2010 | Nielsen et al. | |
| 2010/0158213 A1 | 6/2010 | Mikan et al. | |
| 2010/0253689 A1 | 10/2010 | Dinicola et al. | |
| 2010/0268534 A1 | 10/2010 | Kishan Thambiratnam et al. | |
| 2011/0097693 A1 | 4/2011 | Crawford | |
| 2011/0112833 A1 | 5/2011 | Frankel et al. | |
| 2011/0131144 A1 * | 6/2011 | Ashour | G06Q 10/10 705/319 |
| 2011/0239119 A1 | 9/2011 | Phillips et al. | |
| 2011/0261142 A1 | 10/2011 | Shanmukhadas et al. | |
| 2011/0267419 A1 | 11/2011 | Quinn et al. | |
| 2012/0204118 A1 | 8/2012 | Lefar et al. | |
| 2013/0308922 A1 | 11/2013 | Sano et al. | |
| 2014/0108288 A1 | 4/2014 | Calman et al. | |
| 2014/0122588 A1 | 5/2014 | Nimri | |
| 2014/0176665 A1 | 6/2014 | Gottlieb | |
| 2014/0229866 A1 | 8/2014 | Gottlieb | |
| 2014/0362165 A1 | 12/2014 | Ackerman et al. | |
| 2015/0106091 A1 | 4/2015 | Wetjen et al. | |
| 2015/0200785 A1 | 7/2015 | Gupta et al. | |
| 2015/0326458 A1 | 11/2015 | Gottlieb | |
| 2016/0170970 A1 | 6/2016 | Lindblom et al. | |
| 2017/0099460 A1 | 4/2017 | Nimri et al. | |
| 2018/0190325 A1 | 7/2018 | Hayashi et al. | |
| 2018/0226073 A1 | 8/2018 | Hodge et al. | |
| 2018/0331842 A1 * | 11/2018 | Faulkner | H04L 12/1831 |

OTHER PUBLICATIONS

"International Search Report and Written Opinion Issued in PCT Application No. PCT/US18/027693", dated Jul. 26, 2018, 18 Pages.
"Non Final Office Action Issued in U.S. Appl. No. 15/636,516", dated Feb. 19, 2019, 27 Pages.
"Final Office Action Issued in U.S. Appl. No. 15/636,516", dated Aug. 22, 2019, 32 Pages.

\* cited by examiner

ASSOCIATING A SPEAKER WITH REACTIONS IN A CONFERENCE SESSION

PRIORITY APPLICATION

This application claims the benefit of and priority to U.S. Provisional Application No. 62/506,554 filed May 15, 2017, the entire contents of which are incorporated herein by reference.

BACKGROUND

At present, the use of conference (e.g., videoconference) systems in personal, enterprise, broadcast, and/or commercial settings has increased dramatically so that meetings between people in remote locations can be facilitated. Conference systems allow users, in two or more remote locations, to communicate interactively with each other via live, simultaneous two-way video streams, audio streams, or both. Some conference systems (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS provided by the MICROSOFT CORPORATION, of Redmond, Wash.) also allow users to exchange files and/or share display screens that present, for example, images, text, video, applications, online locations, social media, and any others.

Consequently, conference systems enable a user to participate in a conference session (e.g., a meeting, a broadcast presentation, etc.) via a remote device. However, conventional conference systems do not correlate reactions that occur during a conference session to a speaker.

SUMMARY

The disclosed system addresses the problems described above. Specifically, the disclosed system is configured to determine when burst activity (e.g., an activity hotspot) occurs in a conference session, and associate the burst activity with a speaker that is speaking at a time when the burst activity occurs. Burst activity occurs when a threshold number of notable events (e.g., five, ten, fifty, one hundred, one thousand, etc.) occur within a threshold time period (e.g., ten seconds, thirty seconds, one minute, etc.). In various examples, the thresholds can be established relative to a number of participants in a conference session and/or a duration of a conference session (e.g., a scheduled duration). The system can then communicate data indicating that a threshold number of events occurred while an individual speaker is speaking.

For example, the notable events can be reactions that reflect sentiment of an audience consuming a broadcast presentation where one or more designated speakers are scheduled to speak, and the data communicated can include a notification indicating that one of the speakers received a strong audience reaction (e.g., likes, applause, dislikes, etc.). In another example, the data communicated can be an electronic mail message or a text message informing a user that the speaker received a strong audience reaction. Upon seeing the notification or a message, a user that has not yet joined the broadcast presentation can make a decision to join the broadcast presentation so that the user can view live or recorded content associated with the sentiment of the audience and further understand why the audience reacted so strongly. Consequently, the techniques described herein can increase engagement of a group of users, such as employees of a company, with a broadcast presentation.

In yet another example, the data communicated can be a visual element and/or a graph to be displayed to a user. The visual element can include a timeline representing a duration of the conference session with time intervals to reflect when different speakers spoke in the conference session. The graph can include a representation of the burst activity. The visual element and the graph can be displayed close to one another so a viewer can see the association between the burst activity and a speaker. Or, the visual element and the graph can be superimposed on top of each other so a viewer can see the association between the burst activity and a speaker.

In various examples, the system is configured to analyze a transcript to determine that the threshold number of notable events occur within the threshold time period. The transcript can include text reflecting words spoken during the conference session. A portion or snippet of the text can be associated with a timestamp that indicates when, in the conference session, the text was spoken with respect to a point of playback (e.g., at the one minute mark of the conference session, at the ten minute mark of the conference session, etc.). In one example, the words can be spoken by one or more presenters in a "broadcast" type scenario (e.g., an executive officer of a company may be giving a presentation to employees of the company via a conference session). In another example, the words can be spoken by one or more participants in a "collaboration" meeting type scenario (e.g., a team or a group that includes five, ten, fifteen, etc. people may meet to discuss and edit a work product about to be released). The transcript can further include markers that describe activity that occurs in the conference session. The activity can be detected by the system and added to the transcript and/or manually added to the transcript (e.g., by a host or conductor of the conference session). A marker associated with an individual instance of activity can also be associated with a timestamp that indicates when, in the conference session, the activity occurs with respect to a point of playback (e.g., at the two minute mark of the content of the conference session, at the twenty minute mark of the content of the conference session, etc.).

The activity can comprise different types of notable events. For instance, a type of notable event for which a marker is added to the transcript can include a reaction that reflects sentiment of a participant to the conference session (e.g., a viewer that tunes into the conference session). In additional examples, a type of a notable event can comprise: a participant joining the conference session, a participant leaving the conference session, a comment submitted to a chat conversation associated with the conference session, a modification made to file content (e.g., a page of a document, a slide in a presentation, etc.) displayed in the conference session, a poll that is conducted during the conference session, a vote in response to a poll that is conducted during the conference session, a specific mention of a user (e.g., an "@mention"), a specific mention of a team, a file or a display screen that is shared (e.g., a document, a presentation, a spreadsheet, a video, a web page, etc.), a task that is assigned, a link to an external object that is shared, media (e.g., video) injected into a recording of the conference session, an explicit flag or tag added to the transcript by a user to mark and/or describe an important moment, recognition that a particular voice begins to speak, or any other activity determined to provide value or contribute to understanding a context of the conference session.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide a system that determines when burst activity (e.g., an activity hotspot) occurs in a conference session, and associates the burst activity with a speaker that is speaking at a time when the burst activity occurs. Burst activity occurs when a threshold number of notable events (e.g., five, ten, fifty, one hundred, one thousand, etc.) occur within a threshold time period (e.g., ten seconds, thirty seconds, one minute, etc.). In various examples, the thresholds can be established relative to a number of participants in a conference session and/or a duration of a conference session (e.g., a scheduled duration). The system can then communicate data indicating that a threshold number of events occurred while an individual speaker is speaking. In this way, the user is informed of the occurrence of the threshold number events and correlate the occurrence of the threshold number of events to a particular speaker.

Various examples, implementations, scenarios, and aspects are described below with reference to FIGS. 1 through 10.

Figure 1:
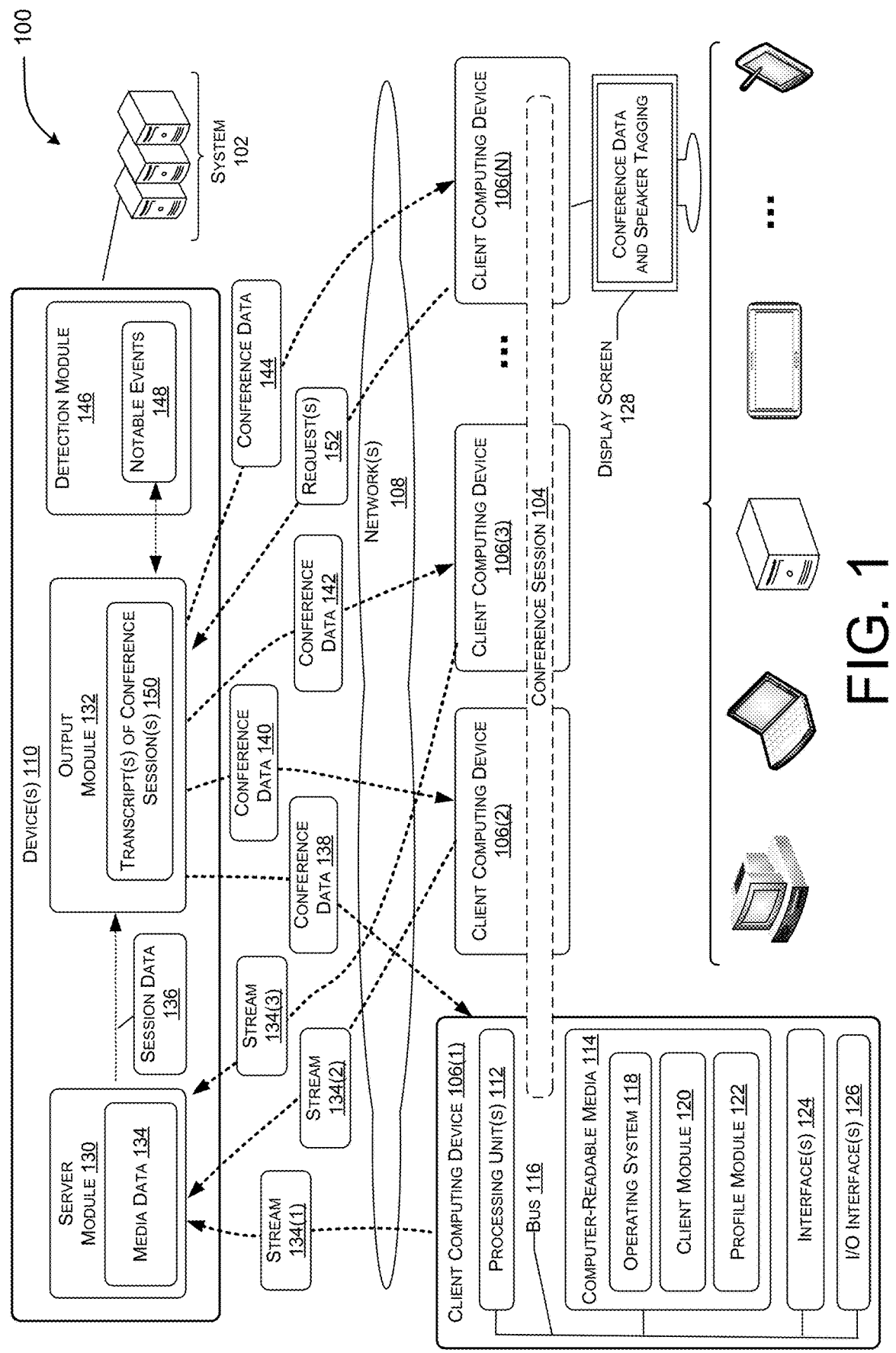
FIG. 1 is a diagram illustrating an example environment in which a system can associate burst activity that occurs in a conference session with a speaker speaking in the conference session.

FIG. 1 is a diagram illustrating an example environment 100 in which a system 102 can operate to associate burst activity that occurs in a conference session 104 with a speaker speaking in the conference session 104. The conference session 104 is being implemented between a number of client computing devices 106(1) through 106(N) (where N is a positive integer number having a value of two or greater). Note that in some examples (e.g., a broadcast scenario), the number N can include hundreds, thousands, or even millions of devices. The client computing devices 106(1) through 106(N) enable users to participate in the conference session 104 (e.g., via a "live" viewing or a "recorded" viewing). In this example, the conference session 104 is hosted, over one or more network(s) 108, by the system 102. That is, the system 102 can provide a service that enables users of the client computing devices 106(1) through 106(N) to participate in the conference session 104. Consequently, a "participant" to the conference session 104 can comprise a user and/or a client computing device (e.g., multiple users may be in a conference room participating in a conference session via the use of a single client computing device), each of which can communicate with other participants. As an alternative, the conference session 104 can be hosted by one of the client computing devices 106(1) through 106(N) utilizing peer-to-peer technologies.

In examples described herein, client computing devices 106(1) through 106(N) participating in the conference session 104 are configured to receive and render for display, on a user interface of a display screen, conference data. The conference data can comprise one instance or a collection of various instances, or streams, of content (e.g., live or recorded content). For example, an individual stream of content can comprise media data associated with a video feed (e.g., audio and visual data that capture the appearance and speech of a user participating in the conference session). Another example of an individual stream of content can comprise media data that includes an avatar of a user participating in the conference session along with audio data that captures the speech of the user. Yet another example of an individual stream of content can comprise media data that includes a file displayed on a display screen and/or audio data that captures the speech of a user. Accordingly, the various streams of content within the conference data enable a remote meeting to be facilitated between a group of people and the sharing of content within the group of people.

The system 102 includes device(s) 110. The device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more conference sessions such as conference session 104. As an example, the system 102 may be managed by entities such as SLACK, WEBEX, GOTOMEETING, GOOGLE HANGOUTS, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 that enable communications with input/output devices such as user input devices including peripheral input devices (e.g., a game controller, a keyboard, a mouse, a pen, a voice input device such as a microphone, a touch input device, a gestural input device, and the like) and/or output devices including peripheral output devices (e.g., a display, a printer, audio speakers, a haptic output device, and the like). FIG. 1 illustrates that client computing device 106(N) is in some way connected to a display device (e.g., a display screen 128), which can display the conference data and/or speaker tagging information.

In the example environment 100 of FIG. 1, client computing devices 106(1) through 106(N) may use their respective client modules 120 to connect with one another and/or other external device(s) in order to participate in the conference session 104. For instance, a first user may utilize a client computing device 106(1) to communicate with a second user of another client computing device 106(2). When executing client modules 120, the users may share data, which may cause the client computing device 106(1) to connect to the system 102 and/or the other client computing devices 106(2) through 106(N) over the network(s) 108.

The client computing device(s) 106(1) through 106(N) may use their respective profile module 122 to generate participant profiles, and provide the participant profiles to other client computing devices and/or to the device(s) 110 of the system 102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for conference sessions.

As shown in FIG. 1, the device(s) 110 of the system 102 includes a server module 130 and an output module 132. The server module 130 is configured to receive, from individual client computing devices such as client computing devices 106(1) through 106(3), media streams 134(1) through 134 (3). As described above, media streams can comprise a video feed (e.g., audio and visual data associated with a user), audio data which is to be output with a presentation of an avatar of a user (e.g., an audio only experience in which video data of the user is not transmitted), file data and/or screen sharing data (e.g., a document, a slide deck, an image, a video displayed on a display screen, etc.), and so forth. Thus, the server module 130 is configured to receive a collection of various media streams 134(1) through 134(3) (the collection being referred to herein as media data 134). In some scenarios, not all the client computing devices that participate in the conference session 104 provide a media stream. For example, a client computing device may only be a consuming, or a "listening", device such that it only receives content associated with the conference session 104 but does not provide any content to the conference session 104.

The server module 130 is configured to generate session data 136 based on the media data 134. In various examples, the server module 130 can select aspects of the media data 134 that are to be shared with the participating client computing devices 106(1) through 106(N). Consequently, the server module 130 is configured to pass the session data 136 to the output module 132 and the output module 132 may communicate conference data to the client computing devices 106(1) through 106(N). As shown, the output module 132 transmits conference data 138 to client computing device 106(1), transmits conference data 140 to client computing device 106(2), transmits conference data 142 to client computing device 106(3), and transmits conference data 144 to client computing device 106(N). The conference data transmitted to the client computing devices can be the same or can be different (e.g., streams and/or the positioning of streams of content within a view of the user interface may vary from one device to the next). The output module 132 can also be configured to record conference sessions (e.g., a version of the conference data) and/or to maintain recordings of the conference sessions.

The device(s) 110 can also include a detection module 146 configured to detect occurrences of notable events 148 (e.g., activity) in the session data 136 of a conference session. For instance, a notable event 148 can occur as a live viewing of a conference session is progressing such that activity that amounts to a notable event by users of client computing devices 106(1) through 106(3) that are participating via the live viewing can be detected and/or added to a transcript of the conference session 150. Alternatively, a notable event 148 can occur during a recorded viewing of the conference session (e.g., client computing device 106(N) can send a request 152 to view a recording of the conference session, and thus the conference data 144 provided to client computing device 106(N) can include recorded content).

Figure 2:
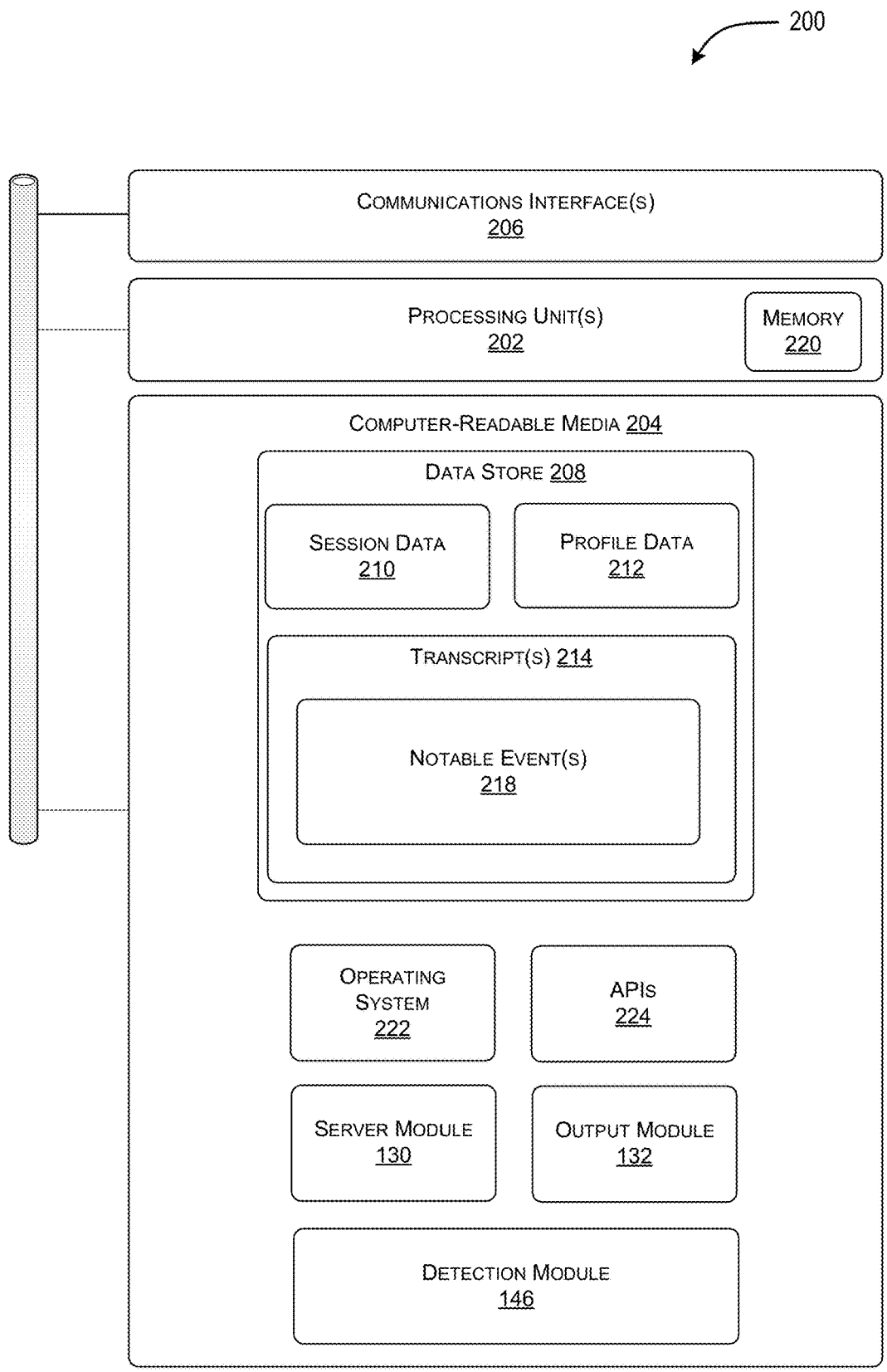
FIG. 2 is a diagram illustrating example components of an example device configured to associate burst activity that occurs in a conference session with a speaker speaking in the conference session.

FIG. 2 is a diagram illustrating example components of an example device 200 configured to associate burst activity that occurs in a conference session with a speaker speaking in the conference session. The device 200 may represent one of device(s) 110, or in other examples a client computing device, where the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS SPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 208 may store data for the operations of processes, applications, components, and/or modules stored in computer-readable media 204 and/or executed by processing unit(s) 202. For instance, in some examples, data store 208 may store session data 210 (e.g., session data 136), profile data 212 (e.g., associated with a participant profile), and/or other data. The session data 210 can include a total number of participants (e.g., users and/or client computing devices) in a conference session, activity that occurs in the conference session (e.g., notable events), and/or other data related to when and how the conference session is conducted or hosted. The data store 208 can also include transcripts 214 of conference sessions, the transcripts 214 including markers for activity that occurs in the conference sessions (e.g., notable events 218).

Alternately, some or all of the above-referenced data can be stored on separate memories 220 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 222 and application programming interface(s) 224 configured to expose the functionality and the data of the device 200 to other devices. Additionally, the computer-readable media 204 can include one or more modules such as the server module 130, the output module 132, and the detection module 146, although the number of illustrated modules is just an example, and the number may vary higher or lower. That is, functionality described herein in association with the illustrated modules may be performed by a fewer number of modules or a larger number of modules on one device or spread across multiple devices.

Figure 3:
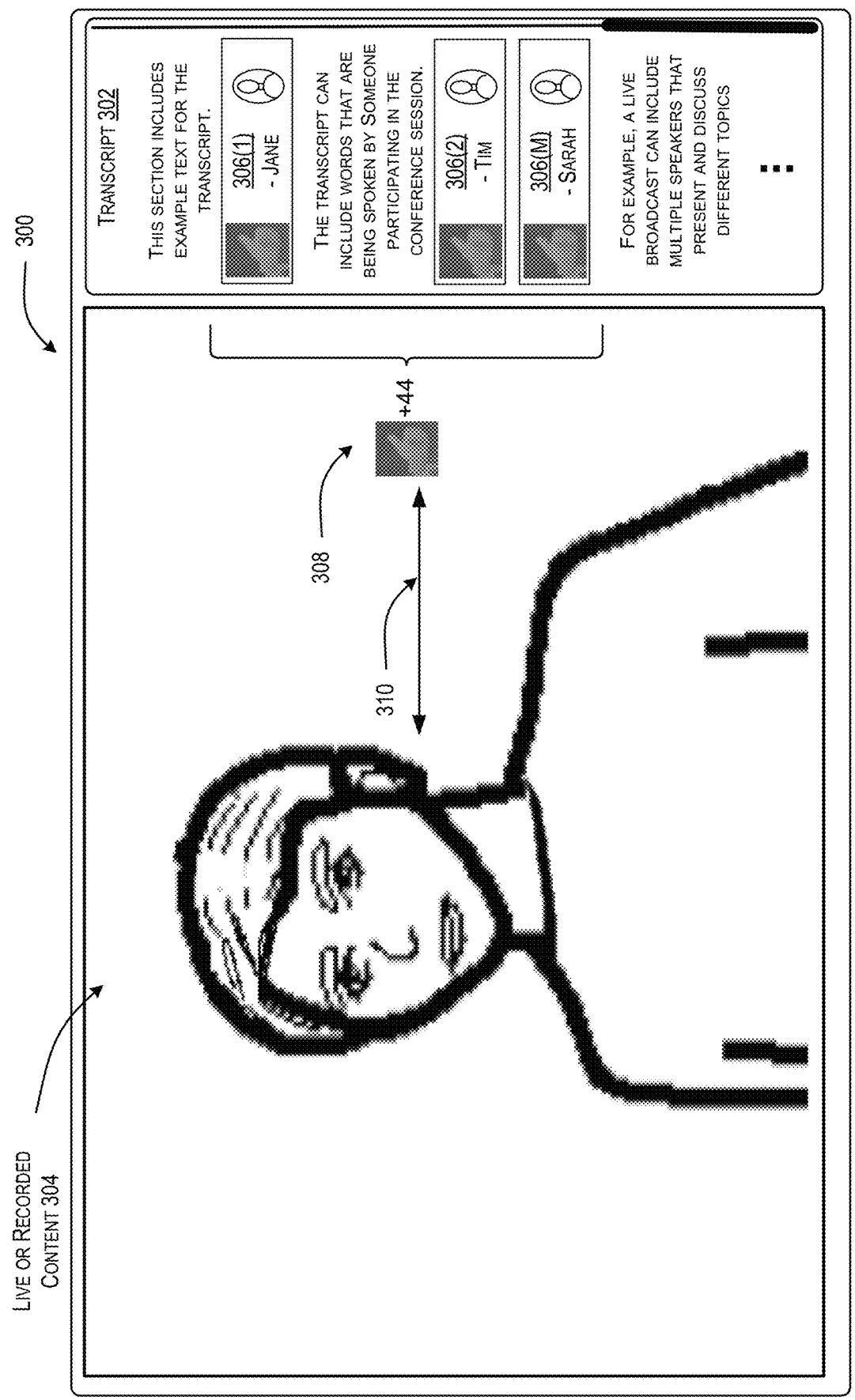
FIG. 3 illustrates an example graphical user interface configured to display a transcript associated with live or recorded content, and detect when burst activity occurs while a speaker is speaking.

FIG. 3 illustrates an example graphical user interface 300 configured to display a transcript 302 associated with live or recorded content 304. In this example, the live or recorded content 304 illustrates a view in which an individual person is speaking (e.g., a presenter on a stage that is speaking to a large audience, a team leader informing his or her team of new procedures, etc.). However, other views of content can be implemented in association with the techniques and examples described herein. A "view" comprises a configuration and/or a layout of content of the conference session. For example, a grid view can include two or more persons speaking in separate cells on a graphical user interface (e.g., a quad cell configuration). Moreover, as described above, file content can be displayed rather than a video feed of a person. Consequently, content of a conference session can be displayed in multiple different views, and multiple different people may speak during the conference session.

The transcript 302 can include text reflecting words spoken during the conference session. As described above, a portion or snippet of the text can be associated with a timestamp that indicates when the text was spoken with respect to a point of playback of the live or recorded content 304. The transcript 302 can also include markers 306(1) through 306(M) (where M is a positive integer number) that describe notable events that occur in the conference session. The detection module 146 is configured to detect the notable events and add the markers 306(1) through 306(M) to the transcript 302. The markers 306(1) through 306(M) can also be associated with a timestamp that indicates when the activity occurs with respect to a point of playback of the live or recorded content 304. The markers 306(1) through 306(M) can be interspersed within the text based on a time of occurrence with respect to the live or recorded content 304 being played back.

More specifically, the markers 306(1) through 306(M) can describe that a reaction to what was said by the speaker is provided by an audience member or a consumer of the broadcast (e.g., a "like" sentiment). The information in a marker that describes a notable event can include an icon that depicts a type of the notable event as well as participant identification information (e.g., a picture, an avatar, a name, user initials, etc.) so a viewer knows a source of the activity. In this example, marker 306(1) includes a "thumbs-up" icon to describe that Jane "liked" what was being said or what was being presented at a particular point or moment in time (e.g., the marker can also include an avatar of Jane). Marker 306(2) includes a "thumbs-up" icon to describe that Tim "liked" what was being said or what was being presented at a particular point or moment in time (e.g., the marker can also include an avatar of Tim). And marker 306(M) includes a "thumbs-up" icon to describe that Sarah "liked" what was being said or what was being presented at a particular point or moment in time (e.g., the marker can also include an avatar of Sarah). A marker can be added to the transcript 302 during a live viewing or a recorded viewing.

In various examples, the detection module 146 is configured to determine that a threshold number (e.g., five, ten, twenty, one hundred, etc.) of notable events (e.g., a reaction such as the "likes" in FIG. 3) occur within a threshold period of time (e.g., five seconds, ten seconds, thirty seconds, a minute, etc.). Based on this determination, a "burst" activity representation 308 of a number of notable events that exceeds the threshold can be generated and/or displayed in association with the transcript 302. The burst activity representation 308 can indicate a number of notable events and/or a type of notable event (e.g. forty-four people "liked" the content within the threshold period of time). The burst activity can capture a specific type of notable event or the burst activity can capture different types of notable events.

Moreover, the burst activity can be associated 310 with a speaker that is speaking in the conference session at a time the burst activity occurs. For example, the speaker can be manually tagged by a host of the conference session. In another example, voice recognition can be used to determine and/or identify a speaker. For instance, the system can access metadata associated with the conference session (e.g., a scheduled list of speakers, participants that have registered to join the conference session, etc.) and access voice models for possible speakers. The voice models can be used to determine time intervals during a conference session when individual speakers speak.

In various examples, a geographic location of a device (e.g., an end-user) that is a source of a notable event (e.g., the provision of a reaction) can be provided and/or obtained. Consequently, a presenter in a broadcast presentation can be made aware that a strong audience reaction is based on a particular geographic region (e.g., employees that live in a particular city may have liked the mentioning of their city). A geographic region can be a variety of different sizes and/or be defined in different ways (e.g., different rooms or floors in a building, different buildings on a campus, a neighborhood community, a zip code, a city, a county, a state, a country, a continent, etc.). The geographic location can be based on an IP address, a GPS signal, or other device and/or networking location and positioning techniques. Further, a reaction map can be generated and/or presented, the reaction map illustrating type(s) of audience reaction(s) that originate in different geographic regions. The presenter, or a host of a session, can determine to share the geographic location information associated with the audience reactions to all the viewers (e.g., a first geographic region may have liked what was said while a second geographic region may have not liked what was said).

Figure 4:
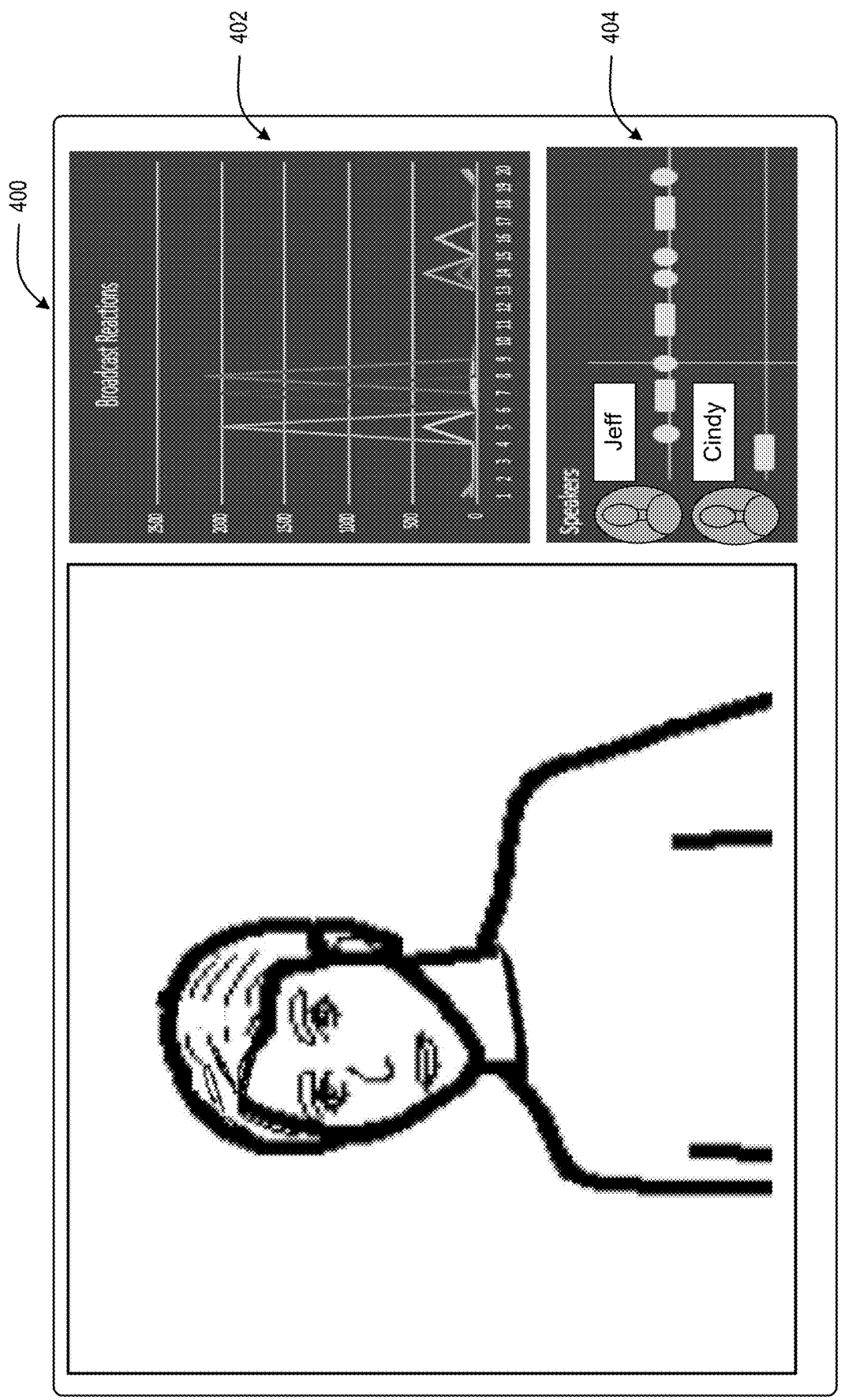
FIG. 4 illustrates an example graphical user interface in which a graph of burst activity and a visual element are displayed to show an association between burst activity and a speaker.

FIG. 4 illustrates an example graphical user interface 400 in which a graph 402 of burst activity and a visual element 404 are displayed. Communicated data to indicate the association between burst activity and a speaker can include the graph 402 and the visual element 404, which can be generated by the detection module 146. The communicated data, in this example, is directed to a user that has already joined the conference session (e.g., the broadcast presentation). The visual element 404 includes a timeline representing a duration of the conference session and individual speakers tagged with one or more representations that correspond to one or more time intervals when the individual speaker speaks. As shown, "Cindy" speaks in the conference session first, and introduces "Jeff" as the next speaker. The visual element 404 can include a stacked view of the possible speakers.

The graph 402 includes representations of burst activity based on a time that the burst activity occurs within the conference session. By viewing the graph 402 and the visual element 404 together, a user can make a connection between a speaker that caused the burst activity (e.g., the speaker that received a strong audience reaction as a result of what was said or some other action or content). In some examples, the graph 402 and the virtual element can be superimposed, one on top of the other.

Figure 5:
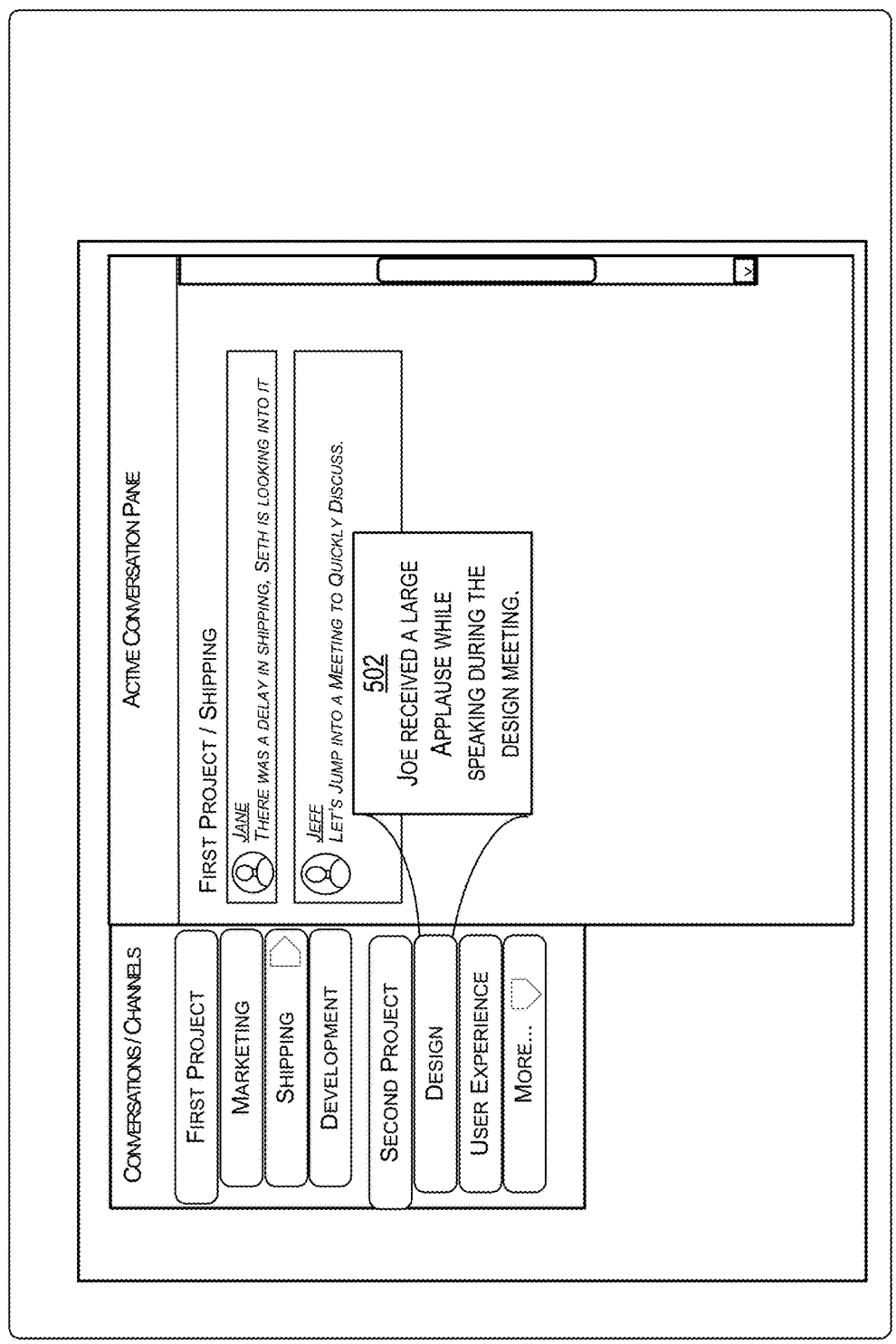
FIG. 5 illustrates an example graphical user interface in which a notification of burst activity can be displayed.

FIG. 5 illustrates an example graphical user interface 500 in which a notification 502 of burst activity can be displayed. The notification 502 can be displayed in association with an object of the conference session. In this example, the conference session may be in the process of being conducted for the Design Team, and thus, a chat associated with the Design Team may include an object that represents the conference session. A user may not have joined the conference session, but rather may be actively "chatting" in a Shipping Team chat, as shown. Accordingly, upon determining that burst activity occurs in the conference session for the Design Team, the notification 502 of the burst activity can pop up and summarize the burst activity. For example, the notification can identify the speaker, identify a type of notable event such as an audience reaction, and/or mention the conference session in which the burst activity occurs (e.g., "Joe received a large applause while speaking during the design meeting."). This allows the user to stay partially engaged with the conference session. Moreover, in various examples, the notification 502 may spark an interest in the user and the user can choose to join the conference session to see why everyone is giving Joe a large applause. The notification 502 can be generated and displayed in association with objects configured in other applications as well (e.g., a calendar application may include an object associated with a conference session).

In another example, the data communicated to indicate an association between burst activity and a speaker can be an electronic mail message or a text message informing a user that the speaker received a strong audience reaction. The user can configure a subscription setting to receive such notifications, as further described herein.

Figure 6:
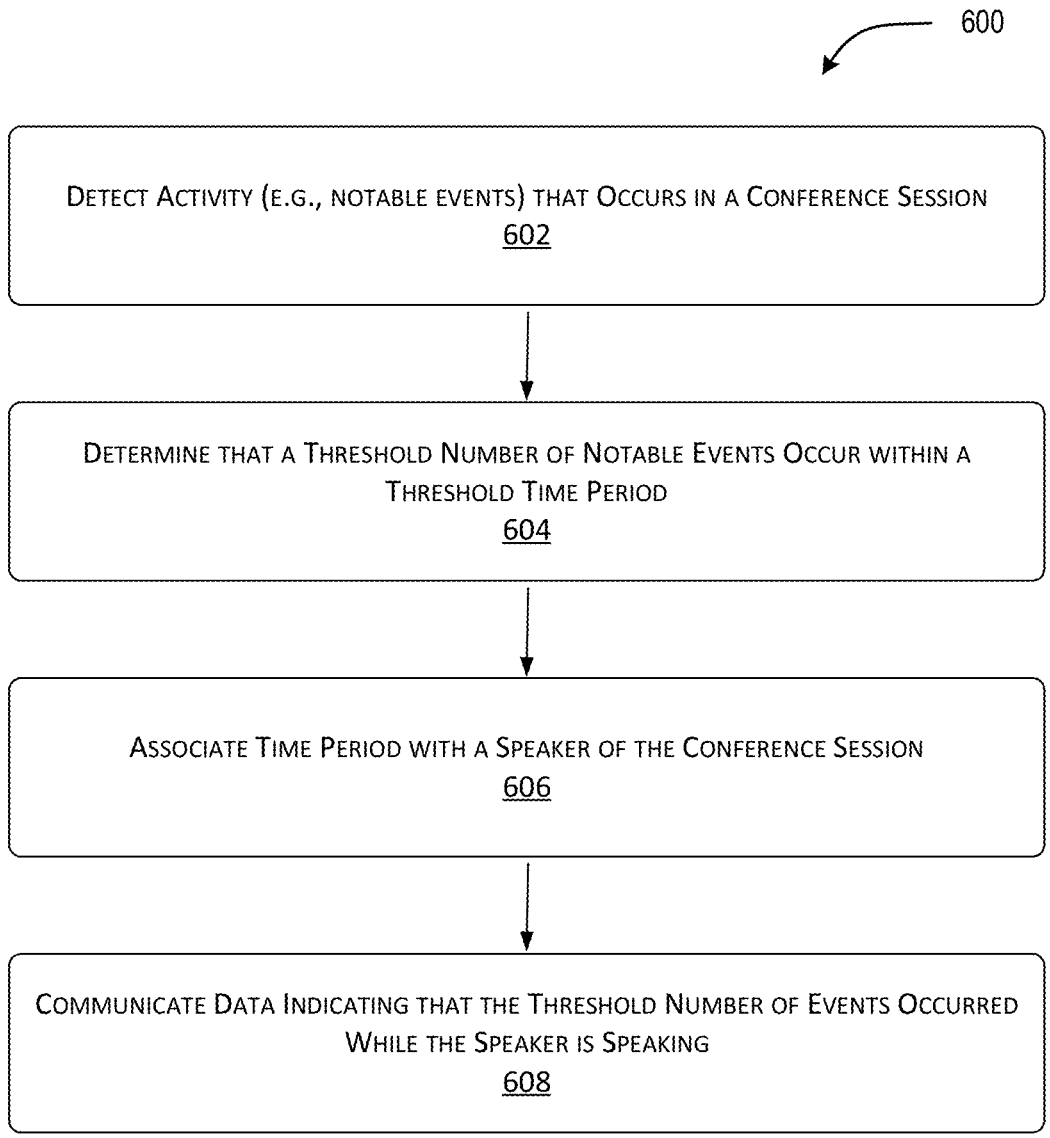
FIG. 6 is a diagram of an example flowchart that illustrates operations directed to associating burst activity with an individual speaker and communicating data that indicates the association.
Figure 7:
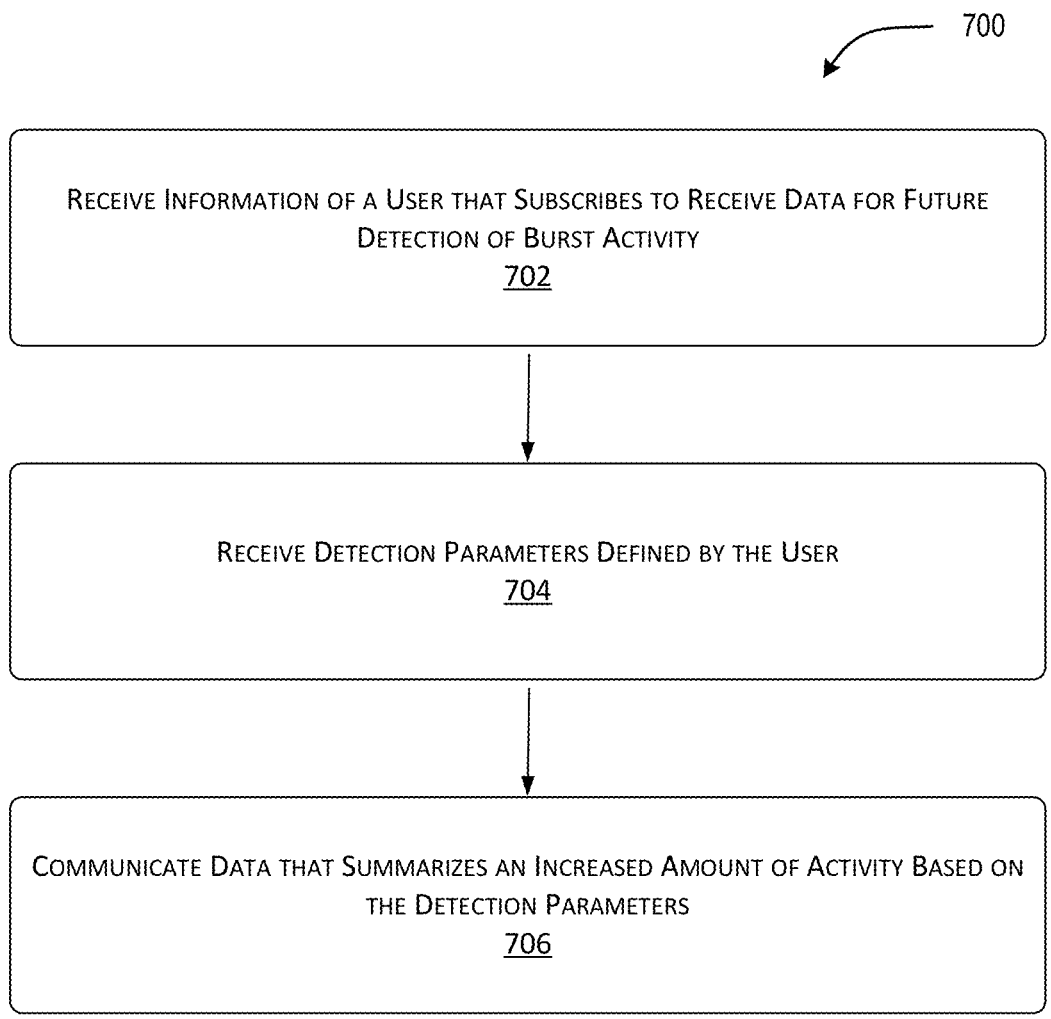
FIG. 7 is a diagram of an example flowchart that illustrates operations directed to establishing a subscription so a user can receive data associated with burst activity via a notification, a text message, an electronic mail message, or another form of communication.
Figure 8:
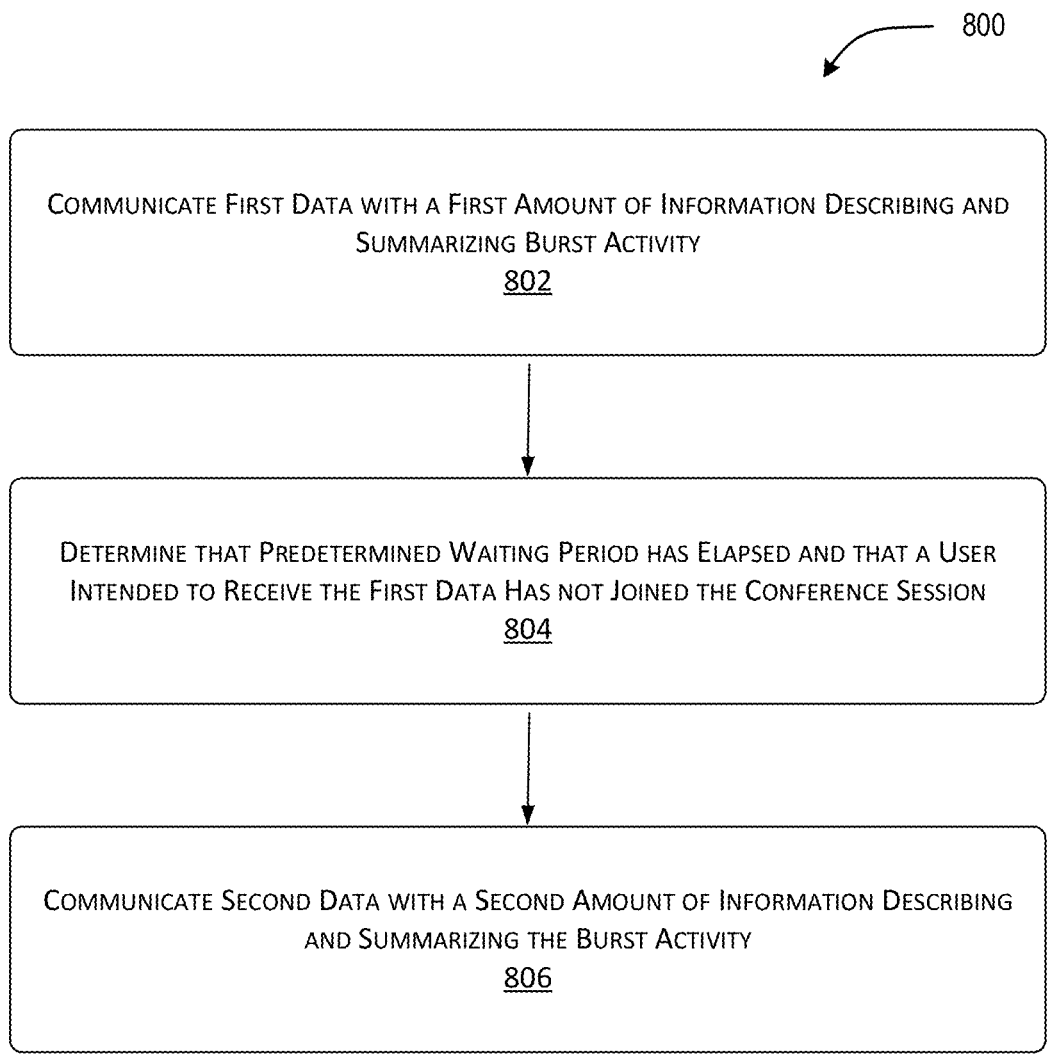
FIG. 8 is a diagram of an example flowchart that illustrates operations directed to escalating the communication of data to inform a user of burst activity and to increase user interest so that the user joins a conference session.

FIGS. 6-8 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, client computing device 106(N), and/or device 200) and/or (2) as interconnected machine logic circuits or circuit modules within the computing system.

Figure 9A:
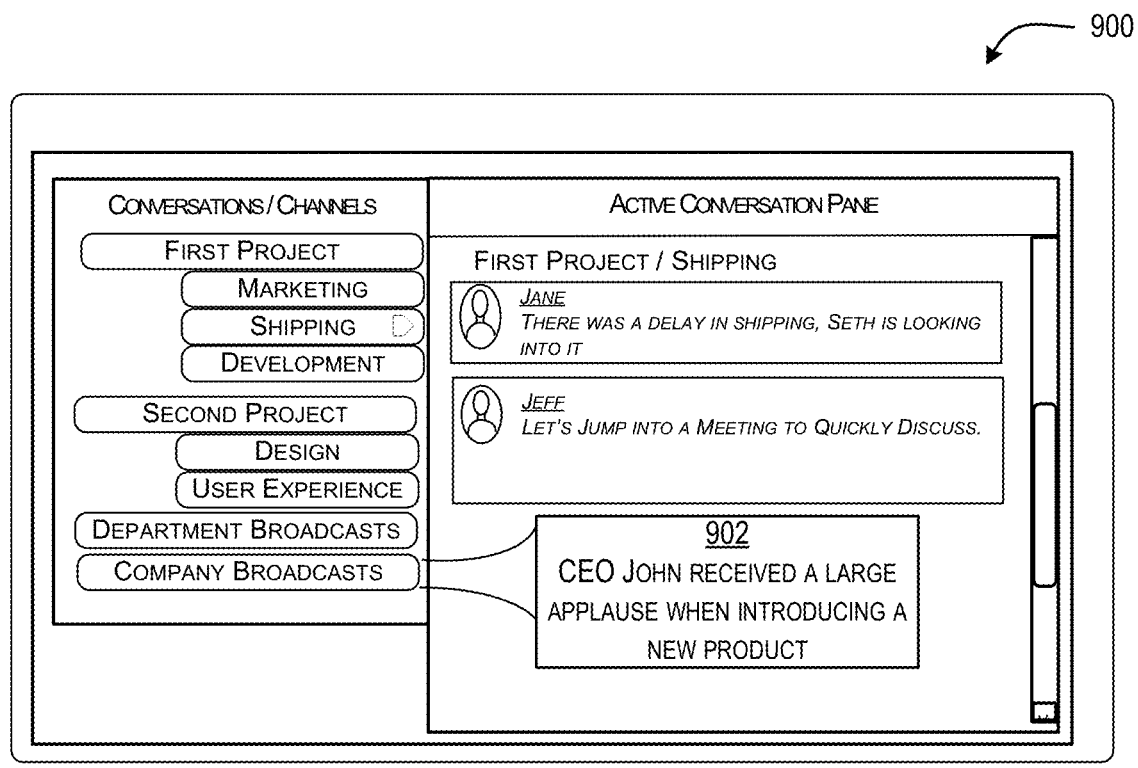
FIGS. 9A and 9B illustrate a scenario where the communication of data to inform a user of burst activity and to increase user interest so that the user joins a conference session is escalated.
Figure 9B:
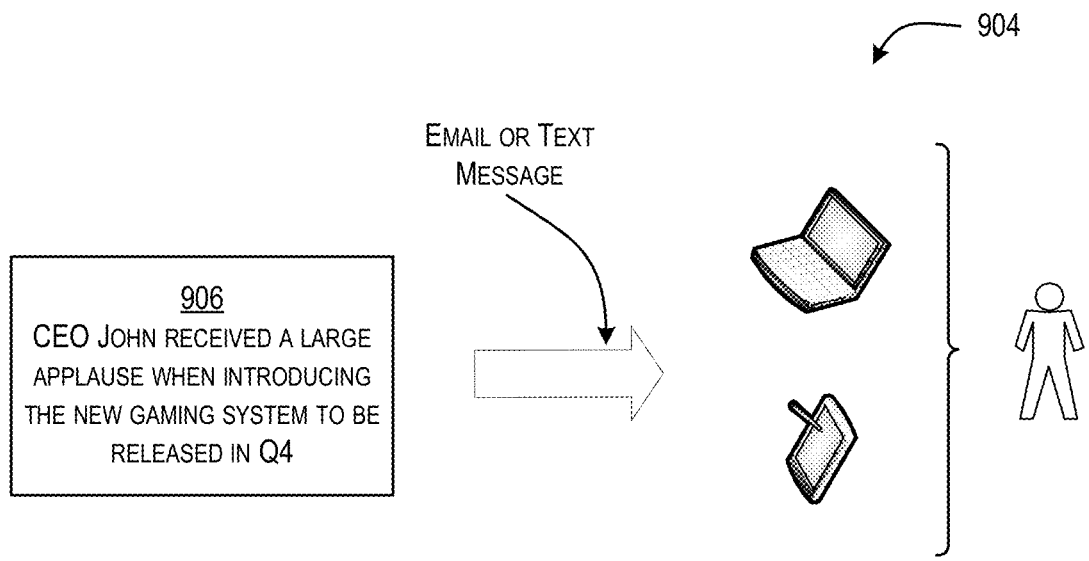

Additionally, the operations illustrated in FIGS. 6-8 can be implemented in association with the example graphical user interfaces described above with respect to FIGS. 3-5, and further described herein with respect to FIGS. 9A and 9B. For instance, the various device(s) and/or module(s) in FIGS. 1 and/or 2 can generate, transmit, receive, and/or display data associated with content of a conference session (e.g., live content, recorded content, etc.).

FIG. 6 is a diagram of an example flowchart 600 that illustrates operations directed to associating burst activity with an individual speaker and communicating data that indicates the association. In one example, the operations of FIG. 6 can be performed by components of the system 102 and/or a client computing device 106(N).

At operation 602, activity that occurs in a conference session is detected. As described above, the activity can be detected during a live viewing and/or one or more recorded viewings (e.g., an individual user or a group of users may be participating in a delayed viewing due to their existence in a different time zone than that of a broadcast speaker).

At operation 604, a threshold number of notable events that occur within a time period is determined. As described above, a threshold can be established based on a number of participants in the conference session (e.g., a size of an audience) so that the threshold can be used to determine when an increased amount of activity occurs with respect to a baseline amount (e.g., an expected amount of activity for the time period). For example, a threshold can be established based on a predetermined percentage (e.g., 10%, 20%, 50%, etc.) of a size of the audience. Accordingly, if the audience size is one thousand people and the threshold is ten percent of the audience, burst activity can be detected if one hundred people provide a reaction that reflects sentiment during the time period (e.g., fifteen seconds, thirty seconds, one minute, etc.). The time period can be established with respect to a portion of the conference session (e.g., a particular moment when the speaker introduces a new product).

At operation 606, the time period is associated with an individual speaker that is speaking.

At operation 608, data indicating that the threshold number of notable events occurred while the individual speaker is speaking is communicated. In one example, the data communicated can comprise a visual element that includes a timeline representing a duration of the conference session and a graph that includes a representation of the threshold number of notable events that occur within the time period of the conference session. The visual element and the graph can be displayed concurrently along with the content of the conference session (e.g., live or recorded content). In another example, the data communicated can a notification associated with an object that represents the conference session. In yet another example, the data communicated can comprise and a text message or an electronic mail message sent to a device or an account a user who has subscribed to receive the data (e.g., the user can define a setting to receive the data based on detection of burst activity that occurs in future conference sessions).

FIG. 7 is a diagram of an example flowchart 700 that illustrates operations directed to establishing a subscription so a user can receive data associated with burst activity via a notification, a text message, an electronic mail message, or another form of communication. In one example, the operations of FIG. 7 can be performed by components of the system 102 and/or a client computing device 106(N).

At operation 702, information of a user that subscribes to receive data (e.g., a notification, a message, etc.) for future detection of burst activity is received. For example, the information can include an email account so an email can be received or a mobile device number so a text message can be received.

At operation 704, detection parameters defined by the user are received. For example, a detection parameter can define a group of users (e.g., a team) for which the data is to be received. That is, a user may want to be informed of burst activity for organization-wide broadcasts and Design Team meetings, but the user may not want to be informed of burst activity that occurs in meetings for the Shipping Team. In another example, a detection parameter can define an individual speaker (e.g., an executive officer of a company) for which the data is to be received. In a further example, a detection parameter can define a type of notable event for which the data is to be received. In this way, the user will only receive notifications for burst activity that are of interest to the user (e.g., positive audience sentiment but not negative audience sentiment). Consequently, operations in the example flowchart 600 of FIG. 6 can be implemented to detect occurrences of burst activity in accordance with user-defined detection parameters.

At operation 706, data that summarizes an increased amount of activity is communicated based on the detection parameters.

FIG. 8 is a diagram of an example flowchart 800 that illustrates operations directed to escalating the communication of data to inform a user of burst activity and to increase user interest so that the user joins a conference session. In one example, the operations of FIG. 8 can be performed by components of the system 102 and/or a client computing device 106(N).

At operation 802, first data is communicated with a first amount of information that describes and summarizes burst activity that occurs in a conference session. For instance, the first amount of information may hint on reasons why strong audience reactions occur to spark a user interest so that the user joins the conference session. In a specific example, an executive officer of a company may be talking about pay raises for employees of the company in a broadcast presentation, and the first amount of information may state "CEO John excited everyone by talking about employee pay."

At operation 804, it is determined that a predetermined waiting period (e.g., thirty seconds, a minute, etc.) has elapsed and that the user intended to receive the first data has still not joined the conference session to view live or recorded content.

At operation 806, second data is communicated with a second amount of information that describes and summarizes the burst activity that occurs in the conference session. The second amount of information can further describe the reasons why the strong audience reactions occur. Therefore, the second amount of information can include additional information that is not included in the first amount of information and the way in which the data is communicated is escalated in order to get the user to join the conference session and engage with the broadcast presentation. Continuing the specific example from above, the second amount of information may state "CEO John announced that each employee of the company is to receive an immediate pay raise of 2% of the current salary."

The descriptions and summaries of the burst activity can be generated based on information extracted from the transcript and/or a meeting agenda for the conference session. In some implementations, different forms of communications can be used to escalate the communication of data to inform a user of burst activity. For example, FIG. 9A illustrates an example graphical user interface 900 within which a notification 902 is displayed. In this example, the first amount of information in FIG. 8 is communicated to a user via the notification 902, which is displayed in association with "Company Broadcasts" and states "CEO John received a large applause when introducing a new product." Thus, the data communicated to inform a user of burst activity can first be communicated via the notification 902.

FIG. 9B illustrates a diagram 904 where a message 906 (e.g., a text message, an email, etc.) is communicated to a device and/or to an account of a user. To further this example, the second amount of information in FIG. 8 is communicated to a user via the message 906, which states "CEO John received a large applause when introducing the new gaming system to be released in Q4." Thus, the data communicated to inform the user of burst activity can subsequently be communicated via the message 906. Consequently, communication of differing amounts of information can be escalated via the use of different forms of communication in order to inform the user of reasons why burst activity occurs and in order to get the user to join the conference session.

Figure 10:
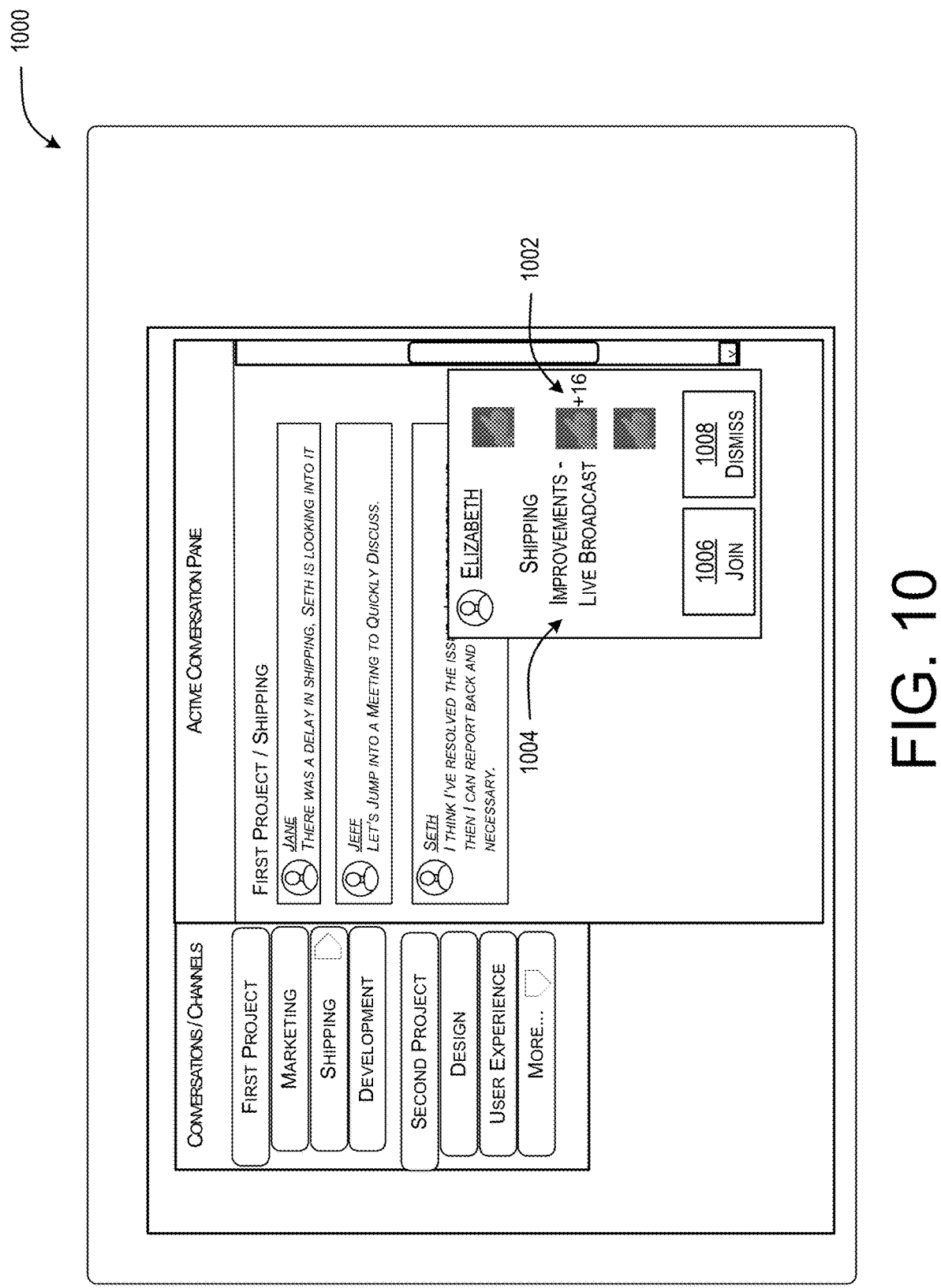
FIG. 10 illustrates another example graphical user interface in which a notification of burst activity can be displayed in association with a conference session.

FIG. 10 illustrates another example graphical user interface 1000 in which a notification 1002 of burst activity can be displayed in association with a conference session. In this example, the notification 1002 of burst activity can be displayed in a window 1004 (e.g., a persistent window, a temporary pop-up window, etc.) that represents a conference session. Here, the window 1004 indicates that Elizabeth is the current speaker and she is presenting information about shipping improvements during a live broadcast. The window 1004 can include an image that represents Elizabeth as the current speaker (e.g., Elizabeth's avatar, a live broadcast feed of Elizabeth presenting, etc.). The notification 1002 of burst activity in this example reflects that sixteen people "liked" a particular moment during Elizabeth's presentation. The notification 1002 can be presented in a stream that reflects other audience reactions throughout the live broadcast (e.g., other "likes") and the notification can include information (e.g., "+16") to accentuate and distinguish burst activity from other activity such as individual audience reactions that do not qualify as burst activity. Moreover, the window 1004 can include an option to join 1006 the conference session and/or to dismiss 1008 the window 1004 (e.g., minimize or remove the window 1004 so a viewer is not distracted by the window 1004).

In some examples, the window 1004 may only be presented in the graphical user interface 1000 if the user is currently engaged with a conversation/channel to which the conference session also belongs. For instance, the user is viewing a conversation pane or chat associated with "shipping" and the conference session in which Elizabeth is presenting is categorized as a "shipping" department broadcast. In other examples, the window 1004 may be presented across different conversations/channels, and thus, even if the user is not viewing the conversation pane or chat associated with "shipping", the window 1004 can still be displayed. This enables a user to be made aware of important broadcasts regardless of category and regardless of what the user is currently viewing. For instance, a company-wide broadcast by a CEO may be presented across different conversations/channels.

In a first example, if a user decides to select the option to join 1006 the conference session, the user may be directed to the current point in time of the live viewing. This may be implemented when the user selects the option to join 1006 the conference session immediately (e.g., within a short period of time such as a few seconds) after the burst activity occurs and the notification is generated and displayed. In an alternative example, if a user decides to select the option to join 1006 the conference session, the user may be directed to a previous point in time so the user can view recorded content associated with the burst activity. This may be implemented when there is a delay (e.g., thirty seconds, minute(s), hour(s), day(s), etc.) between when the burst activity occurs and when the user selects the option to join 1006 the conference session after the burst activity occurs and the notification is generated and displayed. The previous point in time may be associated with a timestamp that marks when the burst activity occurs (e.g., begins) within the conference session. In further examples, the user may be presented with an option to join the conference session at the current point in time of the live viewing, or to join the conference session at the previous point in time so the user can view the recorded content associated with the burst activity.

The disclosure presented herein may be considered in view of the following example clauses.

Example Clause A, a system comprising: one or more processing units; and a computer-readable medium having encoded thereon computer-executable instructions to cause the one or more processing units to: detect activity that occurs in a conference session, the activity comprising a plurality of notable events; determine that a threshold number of notable events occur within a time period of the conference session; associate the time period with an individual speaker that is speaking; and communicate data indicating that the threshold number of notable events occurred while the individual speaker is speaking.

Example Clause B, the system of Example Clause A, wherein the data indicating that the threshold number of notable events occurred while the individual speaker is speaking comprises a notification associated with an object that represents the conference session.

Example Clause C, the system of Example Clause A, wherein the data indicating that the threshold number of notable events occurred while the individual speaker is speaking comprises a text message or an electronic mail message sent to a device or an account a user who has subscribed to receive the data.

Example Clause D, the system of Example Clause A, wherein the computer-executable instructions further cause the one or more processing units to: generate a visual element that includes a timeline representing a duration of the conference session, wherein generating the visual element includes tagging one or more time intervals with one or more representations to reflect the speaking of the individual speaker; and generate a graph that includes a representation of the threshold number of notable events that occur within the time period of the conference session.

Example Clause E, the system of Example Clause D, wherein the visual element comprises a stacked view of the one or more possible speakers, wherein each possible speaker is associated with the timeline.

Example Clause F, the system of any one of Example Clause A through Example Clause E, wherein the threshold number of notable events are associated with a reaction.

Example Clause G, the system of any one of Example Clause A through Example Clause F, wherein the individual speaker is recognized using voice recognition.

Example Clause H, the system of Example Clause G, wherein the computer-executable instructions further cause the one or more processing units to: access metadata associated with the conference session, the metadata identifying one or more possible speakers as designated speakers scheduled to present during the conference session; based at least in part on the metadata, access voice models for individual ones of the one or more possible speakers; and use the voice models to determine one or more time intervals during which the individual speaker of the one or more possible speakers is speaking.

Example Clause I, the system of Example Clause G, wherein the computer-executable instructions further cause the one or more processing units to: access metadata associated with the conference session, the metadata identifying one or more possible speakers as one or more participants that have joined the conference session; based at least in part on the metadata, access voice models for individual ones of the one or more possible speakers; and use the voice models to determine one or more time intervals during which the individual speaker of the one or more possible speakers is speaking.

While the subject matter of Example Clauses A through I is described above with respect to a system, it is understood in the context of this document that the subject matter of Example Clauses A through I can additionally or alternatively be implemented by a device, as a method, and/or via computer-readable storage media.

Example Clause J, a method comprising: detecting, by one or more processing units, activity that occurs in a conference session, the activity comprising a plurality of notable events; determining that a threshold number of notable events occur within a time period of the conference session thereby indicating an increased amount of activity occurs during the time period; determining that an individual speaker is speaking during the time period; and communicating data that summarizes the increased amount of activity that occurs while the individual speaker is speaking during the time period.

Example Clause K, the method of Example Clause J, wherein the data that summarizes the increased amount of activity that occurs while the individual speaker is speaking during the time period comprises a notification associated with an object that represents the conference session.

Example Clause L, the method of Example Clause J, wherein the data that summarizes the increased amount of activity that occurs while the individual speaker is speaking during the time period comprises a text message or an electronic mail message sent to a device or an account of a user who has subscribed to receive the data.

Example Clause M, the method of any one of Example Clause J through Example Clause L, wherein the threshold number of notable events are associated with a reaction.

Example Clause N, the method of any one of Example Clause J through Example Clause M, wherein the detecting occurs based on detection parameters defined by a user, the detection parameters specifying at least one of the individual speaker and a type of notable event.

While the subject matter of Example Clauses J through N is described above with respect to a method, it is understood in the context of this document that the subject matter of Example Clauses J through N can additionally or alternatively be implemented by a device, by a system, and/or via computer-readable storage media.

Example Clause O, a system comprising: one or more processing units; and a computer-readable medium having encoded thereon computer-executable instructions to cause the one or more processing units to: detect activity that occurs in a conference session that includes a broadcast presentation, the activity comprising reactions of an audience to the broadcast presentation; determine that a threshold number of reactions occur within a time period; associate the time period with an individual speaker that is speaking; communicate first data indicating that the threshold number of reactions occurred during the time period while the individual speaker is speaking, the first data including a first amount of information that summarizes what is being spoken by the individual speaker during the time period when the threshold number reactions occur; after a predetermined waiting period has elapsed, determine that a user has not joined the conference session in response to communication of the first data; and communicate second data indicating that the threshold number of reactions occurred during the time period while the individual speaker is speaking, the second data including a second amount of information that summarizes what is being spoken by the individual speaker during the time period when the threshold number of reactions occur, the second amount of information including more information than the first amount of information.

Example Clause P, the system of Example Clause O, wherein the first data is communicated via a first form of communication and the second data is communicated via a second form of communication that is different than the first form of communication.

Example Clause Q, the system of Example Clause P, wherein the first form of communication comprises a notification displayed in association with an object that represents the conference session and the second form of communication comprises a text message or an electronic mail message sent to a device or an account of the user.

Example Clause R, the system of any one of Example Clause O through Example Clause Q, wherein the detecting occurs based on detection parameters defined by the user, the detection parameters specifying at least one of the individual speaker and a type of notable event.

Example Clause S, the system of any one of Example Clause O through Example Clause R, wherein the individual speaker is recognized using voice recognition.

Example Clause T, the system of Example Clause S, wherein the computer-executable instructions further cause the one or more processing units to: access metadata associated with the conference session, the metadata identifying one or more possible speakers as designated speakers scheduled to present during the conference session; based at least in part on the metadata, access voice models for individual ones of the one or more possible speakers; and use the voice models to determine one or more time intervals during which the individual speaker of the one or more possible speakers is speaking.

While the subject matter of Example Clauses O through T is described above with respect to a system, it is understood in the context of this document that the subject matter of Example Clauses O through T can additionally or alternatively be implemented by a device, as a method, and/or via computer-readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units; and
   a computer-readable medium having encoded thereon computer-executable instructions to cause the one or more processing units to:
      detect activity that occurs in a conference session comprising live or recorded content causing a computing device to output the live or recorded content, the activity comprising a plurality of notable events generated by one or more users participating in the conference session, the plurality of notable events generated by the one or more users in response to an individual speaker that is speaking in the conference session;
      determine that the plurality of notable events meets or exceeds a threshold number of notable events within a time period of the conference session;
      associate the time period with the individual speaker that is speaking; and
      communicate data indicating that the threshold number of notable events occurred while the individual speaker is speaking.

2. The system of claim 1, wherein the data indicating that the threshold number of notable events occurred while the individual speaker is speaking comprises a notification associated with an object that represents the conference session.

3. The system of claim 1, wherein the data indicating that the threshold number of notable events occurred while the individual speaker is speaking comprises a text message or an electronic mail message sent to a device or an account of a user who has subscribed to receive the data.

4. The system of claim 1, wherein the computer-executable instructions further cause the one or more processing units to:
   generate a visual element that includes a timeline representing a duration of the conference session, wherein generating the visual element includes tagging one or more time intervals with one or more representations to reflect the speaking of the individual speaker; and
   generate a graph that includes a representation of the threshold number of notable events that occur within the time period of the conference session.

5. The system of claim 4, wherein the visual element comprises a stacked view of the one or more possible speakers, wherein each possible speaker is associated with the timeline.

6. The system of claim 1, wherein the threshold number of notable events are associated with a reaction.

7. The system of claim 1, wherein the individual speaker is recognized using voice recognition.

8. The system of claim 7, wherein the computer-executable instructions further cause the one or more processing units to:
   access metadata associated with the conference session, the metadata identifying one or more possible speakers as designated speakers scheduled to present during the conference session;
   based at least in part on the metadata, access voice models for individual ones of the one or more possible speakers; and
   use the voice models to determine one or more time intervals during which the individual speaker of the one or more possible speakers is speaking.

9. The system of claim 7, wherein the computer-executable instructions further cause the one or more processing units to:
   access metadata associated with the conference session, the metadata identifying one or more possible speakers as one or more participants that have joined the conference session;
   based at least in part on the metadata, access voice models for individual ones of the one or more possible speakers; and
   use the voice models to determine one or more time intervals during which the individual speaker of the one or more possible speakers is speaking.

10. A method comprising:
    detecting, by one or more processing units, activity that occurs in a conference session comprising live or recorded content causing a computing device to output the live or recorded content, the activity comprising a plurality of notable events generated by one or more users participating in the conference session, the plurality of notable events generated by the one or more users in response to an individual speaker that is speaking in the conference session;
    determining that the plurality of notable events meets or exceeds a threshold number of notable events within a time period of the conference session thereby indicating an increased amount of activity occurs during the time period;
    determining that the individual speaker is speaking during the time period; and
    communicating data that summarizes the increased amount of activity that occurs while the individual speaker is speaking during the time period.

11. The method of claim 10, wherein the data that summarizes the increased amount of activity that occurs while the individual speaker is speaking during the time period comprises a notification associated with an object that represents the conference session.

12. The method of claim 10, wherein the data that summarizes the increased amount of activity that occurs while the individual speaker is speaking during the time period comprises a text message or an electronic mail message sent to a device or an account of a user who has subscribed to receive the data.

13. The method of claim 10, wherein the threshold number of notable events are associated with a reaction.

14. The method of claim 10, wherein the detecting occurs based on detection parameters defined by a user, the detection parameters specifying at least one of the individual speaker and a type of notable event.

15. A system comprising:
    one or more processing units; and a computer-readable medium having encoded thereon computer-executable instructions to cause the one or more processing units to:
  detect activity that occurs in a conference session that includes a broadcast presentation comprising live or recorded content causing a computing device to output the live or recorded content, the activity comprising reactions of an audience to the broadcast presentation;
  determine that a threshold number of reactions occur within a time period;
  associate the time period with an individual speaker that is speaking;
  communicate first data indicating that the threshold number of reactions occurred during the time period while the individual speaker is speaking, the first data including a first amount of information that summarizes what is being spoken by the individual speaker during the time period when the threshold number reactions occur;
  after a predetermined waiting period has elapsed, determine that a user has not joined the conference session in response to communication of the first data; and
  communicate second data indicating that the threshold number of reactions occurred during the time period while the individual speaker is speaking, the second data including a second amount of information that summarizes what is being spoken by the individual speaker during the time period when the threshold number of reactions occur, the second amount of information including more information than the first amount of information.

16. The system of claim 15, wherein the first data is communicated via a first form of communication and the second data is communicated via a second form of communication that is different than the first form of communication.

17. The system of claim 16, wherein the first form of communication comprises a notification displayed in association with an object that represents the conference session and the second form of communication comprises a text message or an electronic mail message sent to a device or an account of the user.

18. The system of claim 15, wherein the detecting occurs based on detection parameters defined by the user, the detection parameters specifying at least one of the individual speaker and a type of notable event.

19. The system of claim 15, wherein the individual speaker is recognized using voice recognition.

20. The system of claim 19, wherein the computer-executable instructions further cause the one or more processing units to:
  access metadata associated with the conference session, the metadata identifying one or more possible speakers as designated speakers scheduled to present during the conference session;
  based at least in part on the metadata, access voice models for individual ones of the one or more possible speakers; and
  use the voice models to determine one or more time intervals during which the individual speaker of the one or more possible speakers is speaking.

* * * * *